Patented July 15, 1952

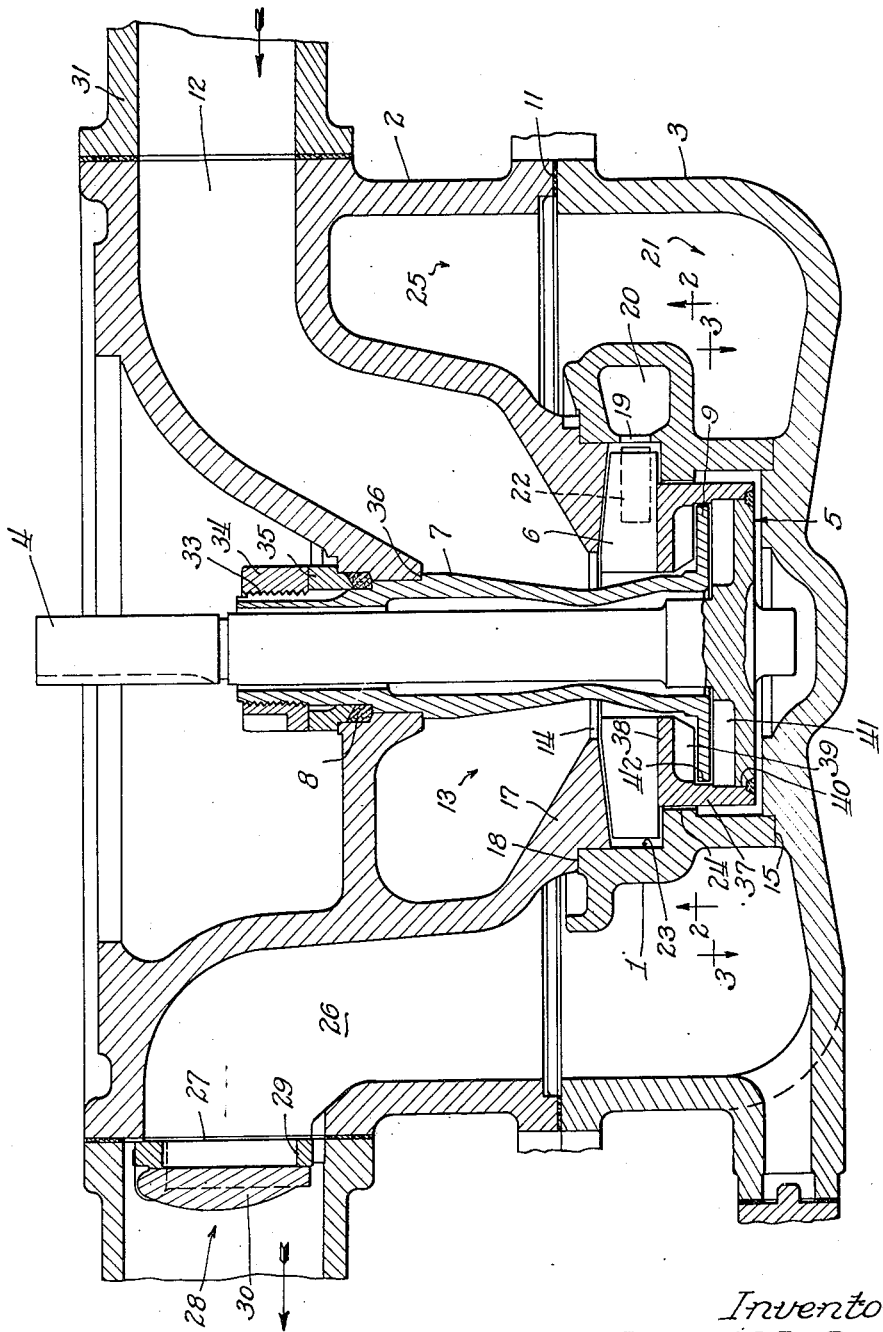

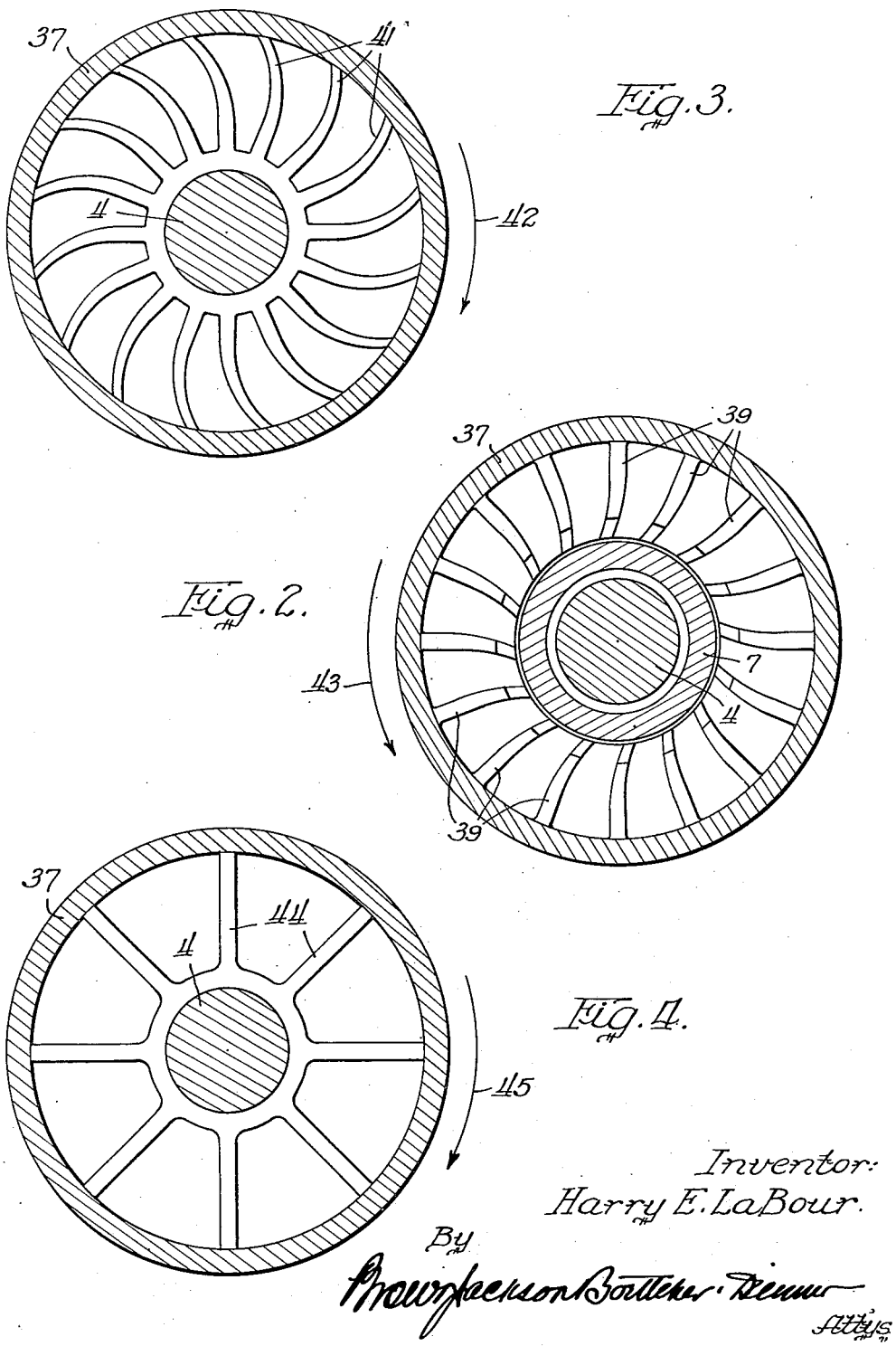

2,603,160

UNITED STATES PATENT OFFICE 2,603,160

LIQUID SEALED CENTRIFUGAL PUMP

Harry E. La Bour, Elkhart, Ind.

Application April 9, 1948, Serial No. 20,057

4 Claims. (Cl. 103—111)

This invention relates to liquid sealed centrifugal pumps, and is primarily concerned with a liquid seal suitable for use in self-priming centrifugal pumps. The chief aim of the invention is to provide an improvement upon the seal of my prior Patent No. 2,381,823. Another aim is to improve the structural organization of a self-priming pump.

The general problem of sealing the shaft of a hydraulic centrifugal pump is complicated by the pressure difference and the variations in pressure difference, between the inside and the outside of the casing at the region where the seal is to be made. Since a self-priming centrifugal pump is located above the level of the source, and since the excess of liquid above that trapped for use in recirculation to produce priming may be drained back to the source, the shaft seal of such a pump need not stand under any appreciable difference of pressure when the pump is not in operation. And since no substantial difference in pressure arises until the impeller begins to rotate, the possibility is present of employing a kinetically activated liquid seal having no solid parts in rubbing contact. Suitable disposal of the parts of the pump with the shaft vertical makes it possible to shut down the pump (i. e., stopping motion of the impeller) with a draining off of the excess liquid without spilling any liquid out of the gap or channel in which the kinetic seal is produced.

The pump disclosed in my aforesaid patent was organized with such an arrangement of parts as to gain the advantage of a kinetic seal. The present pump is an improvement thereupon. Because a self-priming and self-draining pump does not theoretically require any greater difference in pressure to be applied to the seal than that between atmosphere outside and the attainable vacuum of the pump on the inside, the seal may theoretically be required to sustain no greater maximum pressure difference than 14.7 per square inch at sea level.

The kinetic seal is generally made by an annular body of liquid disposed between a rotating part and a stationary part. In practice, an annular body of liquid, U-shaped in cross section, is provided in the seal. As the pressure difference in the pump builds up, the centrifugal force upon the legs of the U increases, but the fluid pressure difference to be sealed tends to drive the liquid from one leg into the other to establish the counterbalancing pressure of liquid in the seal as in a manometer. Sometimes, because of vacuum breaks or other causes, a sudden increase in pressure inside the casing will force the liquid in the seal to shift its position very quickly. Unless provision is made to prevent it, more or less liquid may be driven out of the seal.

Now, while as pointed out in my aforesaid patent, the effect of such irregularities of pressure differences upon continuity or integrity of the seal may be reduced or avoided by producing a constant run of liquid through the seal, a seal requiring no run-through is preferred and the present structure seals without the necessity for run-through.

The expedient employed according to my prior patent to increase the effectiveness of the seal, particularly in case no runthrough is employed, is a set of blades on the rotating parts lying toward the outsides of the legs of the U with the blades of the set on the atmospheric side extending to a less radius than the radius of the blades on the suction side. This insured the presence of liquid around both sides of the margin of the sealing disc, and in the event of a sudden vacuum break, the liquid forced from the atmospheric side over to the vacuum side would meet the shorter radial blades, and their pumping effect would come into play to stabilize the seal.

I have found in practice that during the priming phase and especially on high vacuum, the said prior form of seal operated in less than a satisfactory manner. My study of the operation of the seal led one to conclude that the difficulty resides in the differences in liquid displacement for changes in pressure differences applied to the seal. The seal in cross section may be compared to a manometer having legs of different cross section.

Now although equal changes in pressure difference produce equal changes of the difference in height of the two legs of the manometer, the volumetric displacement required to provide the difference in height of the two legs varies with the cross section.

Apparently what was occurring was that in order for the seal to increase the height of the liquid in the upper leg upon variations in suction inside the pump such as are not unusual, the volumetric displacement required from the lower leg was great enough to empty the liquid from the unbladed outer part of the lower head of the sealing drum. Hence, air could be forced through the seal and unsatisfactory operation resulted.

The unbladed outer part of the lower drumhead of the seal was originally introduced to reduce the pumping effect of the lower blades where the height of liquid in that leg was reduced to a small value. The virtue of the scheme resided in reducing the pumping effect of the lower blades to zero when the height of the leg dropped to the ends of the lower blades.

This small value of height of the lower leg was intended to be enough to seal the edge of the sealing disc and at the same time to keep the vacuum and the pumping effect of the lower sealing blades from exceeding the pumping effect of the upper blades.

Hence, when the problem was encountered it appeared to be insoluble by any expedient or means then known.

I conceived the possibility of producing an equal displacement for equal differences in height of the two legs by extending the lower blades out to the side of the drum, and then reducing the effectiveness of pumping of the said lower blades by either reducing the number of blades or by changing the curvature of the blades, both of which expedients are well known in the art. This solved the problem, and at the same time opened up the liquid passageways to minimum restriction, so that solids would more easily flush out of the seal.

I am aware that it is old to employ blades upon both sides of a liquid seal, and to make these blades of the same or different maximum radius, but no one, so far as I am aware, has encountered the same problem and solved it by blades of the same axial dimension and the same maximum radius, but of different pumping effectiveness.

In brief, I discovered that the seal may be stabilized by keeping both legs of the liquid body under continuous pumping effect, but of different degrees of effectiveness. There are two specific ways which I have discovered, and which are herein disclosed for producing the desired effect of allowing the blades on the suction side to produce maximum effectiveness in energizing the normally effective side of the seal, but bringing in the necessary stabilizing effect of the counterbalancing blades of the atmospheric side to save the liquid and maintain the integrity of the seal upon a sudden vacuum break or on variations of suction during priming.

There are certain advantages which flow from the present invention. The structure lends itself to easier manufacture and allows of more accurate formation of these rather fine and compact parts in an otherwise coarser construction. Since the parts are frequently required to be made of corrosion resistant metal which presents well known difficulties in casting and finish, the present invention has, for this reason alone, a marked utility.

In operation, the extension of both blades to the outer radius of the body or barrel of the drum permits the flushing of impurities out of the seal, with minimum restriction. The blades of the sealing drum have maximum effectiveness at their maximum radius, and it is desirable to keep these parts clear of solid deposits. Upon shutdown of a pump thus equipped, the vacuum tends to be held up by the retardation of the backflow of the liquid column, and when this is continued below the spinning of the shaft at a speed which will develop an outward pressure in the seal, air will push liquid out of the seal toward the inside of the pump and flush out the seal, washing out solids. The seal is of course restored by the liquid trapped in the pump to serve as a priming charge. By minimizing the restriction to the one necessary clearance, the flushing out action is improved, and solids have less tendency to deposit.

A further feature of the present invention resides in the simplification of the main structural parts of the pump which may be utilized independently of the particular form of the seal. Two main outer shells are joined at their outer peripheries. Between the bottom of the intake trap and the bottom of the lower shell there is held a single cylindrical impeller casing shell with ports and ducts for cooperation with the impeller which is disposed therein. The structure is particularly advantageous in the simplification in the required casings, in the machinery operations, in assembly and in servicing. This organization of parts may be utilized in a pump in which the seal between the top casing part and the shaft is made by an ordinary packing gland and the liquid seal parts omitted.

Now in order to acquaint those skilled in the art with the manner of constructing and operating a device embodying my invention, I shall describe, in connection with the accompanying drawing, a specific embodiment of the same.

In the drawings:

Figure 1 is a vertical longitudinal section through the body of a vertical self-priming pump in which my invention is embodied;

Figure 2 is a sectional view taken on the line 2—2 of Figure 1, viewed in the direction of the arrows;

Figure 3 is a similar sectional view taken on the line 3—3 of Figure 1, looking in the direction of the arrows; and Figure 4 is a sectional view of a modified form taken on the same plane and in the same direction as that of Figure 3.

The main operative features of the pump shown in Figure 1 comprise a stationary pump body and a movable rotor. The stationary body as shown consists of two outer shells 2 and 3 which are preferably formed as separate castings clamped together at their facing margins to form the main closure, and an inner cylindrical impeller barrel member 1 clamped between them to form an impeller and seal housing disposed in the lower central part of the shell 3. The rotor comprises the shaft 4 and certain other parts which are rigidly connected to the lower end thereof, consisting generally of a sealing drum 5 and connected impeller blades 6 forming an impeller. The shaft 4 is supported and is adapted to be operated by a suitably journalled extension, which extension is mechanically unitary with the said shaft 4, and the journal on bearings for which are above and rigid with the upper shell 2.

A central sealing sleeve 7 makes a fluid tight joint with the upper casing half 2 at the packing 8, and is mechanically supported in an opening in the upper casing half 2 through which opening the sleeve projects. At its lower end, the sleeve extends through the central open part of the impeller and through the central open part of the upper head or top of the sealing drum, and carries at its lower end an integrally connected disk 9 embraced by the two heads and shell of the sealing drum 5.

The upper body portion 2 and the lower body portion 3 are clamped together with a suitable gasket or other seal, as indicated at 11. The upper casing portion 2 has an inlet opening 12 which leads laterally into the pump casing, and then downwardly into a central annular chamber 13 which is the inlet trap of the self-priming pump. This trap 13 provides an annular space above the sleeve 7 and opens at its lower end through an opening 14 in the lower conical wall into the central part or eye of the impeller 6. The lower casing half has on its inner bottom portion an annular seat 15 upon which is seated an annular body 1 which forms with the radially inwardly extending flange 17 an impeller casing. In pumps where the blades 6 are coextensive radially with the sealing drum 37 the offset or flange 24 of the said cylindrical barrel or shell 1 is not required. Annular seat 18 on the bottom of the central part of the upper casing portion 2 engages the upper end of the impeller casing barrel 16. This barrel 1 has one or more pairs of ports 19—22 leading into throats such as 20. The outer ends of the throats 20 open into the annular space 21, which forms the bottom of a discharge trap for the self-priming pump. Preferably two pairs of ports 19—22 and corresponding throats, as disclosed in my prior Patent No. 2,381,823, are employed, and the ports themselves, with connected throats, are preferably made in accordance with the teachings of my Patent No. 2,367,032. Where two pairs of throats are employed, they are preferably arranged on opposite sides of the impeller casing barrel 1. The impeller casing barrel 1 has an annular inner cylindrical surface 23 interrupted only by the ports opening out of it and into it, and the blades 6 of the impeller sweep this annular surface with such clearance as is customary in the concentric casing type of pump. This clearance may, for example, be $\frac{5}{16}$" or it may be more or less, for an impeller of 6" diameter, depending upon the particular circumstances of the embodiment. The clearance at top and bottom of the impeller is preferably of the order of $\frac{3}{32}$", although this may also be varied. The object is to prevent excessive leakage past the blades, and at the same time give sufficient clearance that the impeller will not rub against either surface. While a rotor with straight blades 6 is shown, obviously, the shape of the blades is subject to modification. Also, while I have shown a cylindrical shell 1 with the blades sweeping the inner periphery, a volute type of shell of the character shown in my Patent No. 2,244,397, with an appropriate impeller may be utilized.

The impeller casing has an inwardly extending flange 24 in the specific pump herein shown to provide a fairly close running fit between it and the cylindrical surfaces of the sealing barrel 5. Where the blades 6 and the barrel are of the same diameter, no offset in the inner wall of the impeller casing member 1 is required.

It can now be seen that the main stationary parts of the pump, exclusive of the sleeve and disk 7, 9, for sealing the shaft, consists of the upper generally circular body 2, the lower generally circular body 3, and the connecting impeller barrel 1, which is held more or less tightly between the two parts, and provides the ports and passageways through which working communication between the two main parts is had.

The discharge trap, part of which is found in the lower casing portion 3, and a part of which is formed in the upper casing portion 2, is generally annular, and has a discharge duct 26, which extends upwardly and leads out laterally at 27 through a flow retarder 28. The flow retarder comprises a seat member 29 and a hinged flap member 30, the function of which is to retard the backward flow of fluid through the pump which begins when the pump shaft starts to slow down upon stopping of operation of the pump.

It is of course understood that a pump of this type is normally placed above the level of the liquid to be pumped, and that the intake pipe 31 extends down into the liquid to be pumped, and requires no intake check valve.

The sealing parts for the shaft of the pump comprise the sleeve 7 which extends up through the central opening in the upper casing half. More specifically it extends through the central wall of the top of the intake trap, and an extension of the sleeve is threaded as at 33, and engaged by a clamping nut 34, which forces down a follower ring into a gland recess containing packing 8 to seal the sleeve to the wall of the casing. The sleeve 7 has the shoulder 36 at a point which will locate the sleeve vertically in the position desired, and which receives the reaction of the clamping nut 34. The sleeve 7 is somewhat constricted at its central part where it passes through the opening 14 at the eye of the impeller. It carries the disk 9 at its lower end. The top and bottom surfaces of the disk 9 are parallel and planar and the outer peripheral surface is cylindrical in the preferred form of the invention. A sealing barrel 5 comprises a top part which provides an inwardly extending flange 38 that forms the upper drum head and the cylindrical portion 37 which forms the outer cylindrical wall or shell of the drum. The main impeller blades 6 are formed integrally on the top wall 38, and their motion brings about the main priming and pumping function of the pump. On the inside surface of the drum head 38 there is provided a set of substantially straight radial blades 39, the function of which is to operate on the liquid on the top side of the sealing disk 9 and tend to drive it around the outer margin of the sealing disk 9 in the direction against suction, that is, towards atmospheric pressure.

The lower head of the sealing drum is formed by the disk 5, integral with the bottom of the rotor shaft 4. The outer peripheral surface 40 of the disk 5 is cylindrical and has a press fit inside the rim of the depending flange portion 37 where it is secured in any suitable way. In the present embodiment it is shown as being joined by welding.

This disk 5 carries on its upper surface the integral blades 41, which are shown in the preferred form in Figure 3. The blades 41 are curved back with respect to the direction of rotation as indicated by the arrow 42 on Figure 3. As a result their pumping pressure is reduced as compared to straight blades of the same number and location. As shown herein, the number of blades 41 is the same as that of the blades 39.

It will be observed that the blades 39 have at their inner radial ends a slight forward curvature with respect to the direction of rotation indicated by the arrow 43 in Figure 2. This forward curvature assists the entry of liquid between the blades, particularly where they are as closely spaced as in this embodiment. Obviously, this slight lead on the inner ends of the blades may be omitted or varied, and obviously, as will be apparent from the function of these blades, their form may be varied, so long as they provide in relation to the opposing blades such as 41 or 44 on the bottom of the sealing disk 9, less effective liquid pumping characteristics when in operation.

It is desirable, in the construction of the two sets of blades, to cast them integrally with the parts on which they are carried. These parts are frequently made of corrosion resisting metal having a considerable chromium content, and such metal is both difficult to cast and difficult to machine. A sharper and cleaner casting can be made where the cores between blades have connection with the surrounding core material, either at the inner radial ends or at the outer radial ends of the same or both.

In Figure 4 I have shown a modified form of the blading below the sealing disk 9. The blades 44 in this case are fewer in number and are substantially straight radially. The blades 44 as a whole when the same are driven in the direction indicated by the arrow 45 are less effective on liquid contained in them than the blades 39 above the sealing disk 9 under the same conditions. In brief, the arrangement of Figure 4 is alternative to the arrangement of Figure 3, in that instead of utilizing the backward curvature of the blades in Figure 3 to reduce the pumping effect, particularly as to pressure, the utilization of fewer blades, even though they may be straight, as in Figure 4, or of any preferred form, is another way to make the pumping effect less, as compared with the pumping effect of the blades shown in Figure 2 which produce the opposing pressure directed towards atmosphere; i. e., to resist suction.

In starting the operation of the pump, assuming that it is first filled with sufficient liquid to form a priming charge, the liquid may stand up about half way in the intake trap 13. Upon the rotor being driven to speed by its driving motor, the impeller blades 6 are caused to sweep the pumping channel, and the sealing drum is caused to drive liquid into the outer ends of the blades 39 and 41, and thereby seal the gap 42 at the periphery of the sealing disk 9. The two sets of blades 39 and 41 are so designed as to length and effectiveness when filled with liquid, and with no substantial pressure difference between the inside and the outside of the intake of the pump that liquid will be held in the annular U-shaped clearance, consisting of the blades 39 and their clearance, the gap 42, and the blades 41 and their clearance with the disk 9.

If desired, the proportioning of pressures may be such as to cause a constant or occasional outrun of liquid through the sleeve 7, but this generally is not desirable. Hence, the preferred embodiment here disclosed holds the liquid in the annular U-shaped channel about the margin of the sealing disk 9 and effectively seals the pump.

The impeller 6 drives liquid out through the ports such as 19. The pump will quickly organize reentry of liquid, driving mixture out of the preceding or anterior port 22 of the pair, and allowing reentry at the secondary or auxiliary port 19 to bring back liquid into the impeller to be mixed with air and driven out again at the port 22 in an organized evacuation of air from the intake passageway, until the pump is primed, i. e., the suction passages filled with liquid. Thereupon, both ports are filled with liquid and serve as discharge ports. Obviously, where two pairs of ports are employed on opposite sides of the impeller housing or barrel 16, they perform the same general function.

During the time that air is being evacuated from the intake and expelled into the discharge pipe, the pressure difference increases between the inside of the sleeve 7, which is at atmospheric pressure and the outside of the same sleeve, which is under suction. In other words, atmospheric pressure assists the lower blades 41 in trying to force liquid through the sealing gap 42 and tries to enter around the outer edge of the disk 9. As the air enters the blades 41, and pushes liquid in them out outwards the outer radial periphery, the blades having less liquid to work on can exert less overall pressure on the lower end of the gap 42. Hence, the pressure generated by the blades 39, which pressure opposes the pressure genrated by the blades 41, will hold liquid in the gap 42, even up to the maximum suction which the pump can attain. Preferably a suitable margin of safety as to sustaining such pressure difference is built into the construction. For the pump here illustrated, the blades 39 must generate enough pressure to oppose slightly more than maximum suction of the pump. Suitable dimensions and speeds are known by the art.

It is generally not intended to drive liquid from the seal into the inside of the sleeve, and particularly it is undesirable to do so during the priming period, since a continuous outrun might seriously deplete the priming liquid. To add to the difficulty of operation, occasionally the pump will suddenly have its suction uncovered, or the intake pipe will be ruptured, so that a sudden rush of air may enter the intake of the pump, and if the seal were not self-regulating, the inertia effect might drive the liquid out of the seal up into the space between the sleeve 7 and the shaft 4. While there is some storage room in this annular space between the sleeve and the shaft, there is, on the whole, a considerable restriction to sudden outward flow. The real safety feature resides in the blades 41, which when they are completely or substantially filled with liquid, will exert a sufficient counter pressure to prevent liquid from being driven out of the sealing gap 42. Also in priming against a high suction lift by the production of what is termed "dry vacuum" the column of liquid in the suction pipe will sometimes oscillate up and down and produce high peaks of pressure difference on the seal. At those times the liquid tends to be drawn out of the seal by being driven inwardly. The net result is that the construction prevents atmospheric pressure, plus the blades 41 from unsealing the sealing disk, even though the vacuum in the pump is the highest attainable. And on the other hand, the parts are so arranged as to prevent any sudden loss of vacuum or inrush of atmospheric pressure into the intake side of the pump from dislodging the seal between the sealing barrel and the sealing disk or broadly stated, between the shaft and sleeve 7. While it may appear that the relation between the blades on the opposite sides of the disk is required to be rather exact, it is to be observed that there are other factors operative to resist movement of the liquid to a degree which would unseal the shaft.

The seal frequently is required to perform the function of sealing the self-priming pump shaft under difficult conditions. When the pump stands still with a charge of priming liquid the drum 5 is completely submerged and is filled with liquid trapped by the intake trap 13 from a prior pumping operation. Liquid in the separator 21 communicates with the impeller chamber through the ports 19 and 22. Similarly, liquid in the trap 13 communicates with the impeller chamber through the inlet eye 14. As a result, the drum 5 is submerged in liquid and is filled with liquid, and liquid stands at the sleeve 7. Upon starting rotation of the shaft, the annular U-shaped body of liquid in the seal is subjected to the pumping effect of the blades 39 and 41. At the same time the pump proper begins to produce a partial vacuum upon the liquid at the inner ends of blades 39. Liquid fills the blades 41 and 39. The blades 41 are of the same maximum radius, but extend inwardly further than the blades 39. As suction begins to assist the blades 41, liquid will be withdrawn from between the sleeve 7 and shaft 4 until the following air enters the inner ends of blades 41. Then as the suction further increases, the blades 41 are further emptied and the excess liquid from blades 39 is drawn into the interior of the pump and enters the impeller.

If now oscillation of pressure occurs, as is not infrequent in the priming stage, the seal will also oscillate as to the height of the respective legs of the seal, and liquid may be lost out of the seal into the inside of the pump. But such oscillations of pressure now produce no inequalities of variation in height and hence filling of the upper blades 39 at the expense of liquid of the lower blades 41 does not uncover the outer margin of the sealing disc 9. Since a self-priming pump will always during operation have sub-atmospheric pressure at the inner end of the blades 39, those blades 39 must be effective to oppose the inward pumping effect of blades 41 plus the pressure of atmosphere. By making the blades 41 of the same maximum diameter and of the same axial dimension as the blades 39, but making them of less pumping effectiveness, the desired effect of substantially equal variation of height of the legs of the seal for equal variations of volumetric displacement is attained, and at the same time the seal is effective to retain a charge of sealing liquid under the difficulties of the working conditions to which such a pump is subjected.

The construction of the main pump parts, namely, the upper casing half, the lower casing half, and the impeller barrel member 16 as three independent but interfitting parts, is highly advantageous. A fitting of the parts together is simple. The machining operations are simplified and reduced. The main castings which are frequently required to be made of a chromium alloy are made more symmetrical and easier to mold and pour, and the impeller barrel member 16 is likewise easier to cast, particularly in difficult metal, and easier to machine in the same or in any metal.

I do not intend to be limited to the specific details shown and described, except as they are made essential by the appended claims.

I claim:

1. In a pump of the class described having a casing and a rotor including an impeller cooperating therewith to produce suction therein, the combination of a vertical stationary sealing sleeve joined at its upper end to the casing above the impeller and terminating at its lower end in a flange forming a sealing disc, a sealing drum disposed with its axis vertical providing an internal annular sealing channel generally U-shaped in cross section embracing the outer margin of the disc, the legs of the U being of substantially equal thickness axially, a shaft comprising a part of said rotor, said shaft extending through the sleeve and being connected to the lower head of the drum, the upper head of the drum being open at the center to receive said sleeve, said opening being adapted to communicate with a region in the casing where suction is developed during operation of the impeller and liquid may enter, the annular space between the shaft and the sleeve being adapted to communicate with pressure external to the pump, a set of liquid working blades on the inside of the perforated head of the drum, and a set of liquid working blades on the inside of the opposite head of the drum, both sets of blades being of substantially the same axial width and of substantially the same maximum radius, said latter set of blades opening out to the full inner diameter of the drum, the clearance between the outer periphery of the disc and the inner periphery of the drum constituting the sole restriction to flow of liquid between said two sets of blades, the second set of blades having less effective liquid impelling characteristics than the first set of blades when the drum is rotated.

2. The combination of claim 1 wherein the blades of the two sets are of different curvature, the blades of the first set having greater pumping effectiveness than the second set.

3. The combination of claim 1 wherein the blades of the second set are less in number than those of the first set, and have less total pumping effectiveness than those of the first set.

4. In a self-priming centrifugal pump of the class described having a vertical impeller shaft carrying a rotatable sealing drum the lower head of which is closed and connected to the lower end of the shaft, and the upper head of which is centrally apertured and carries above it the main liquid pumping impeller, and having a vertical sealing sleeve surrounding the shaft with a horizontally disposed sealing rim on its lower end embraced by the drum, said sleeve extending through the aforesaid central opening in the upper head of the drum, the improvement which comprises blade means on the inside of the upper head of the drum and blade means on the inside of the lower head of the drum, both of said blade means having substantially the same axial width and substantially the same maximum diameter, the liquid impelling effectiveness of the blades on the lower head being less than those of the blades on the upper head, said two sets of blades acting on contained sealing liquid to oppose changes in pressure difference upon the seal to the extent of preventing the discharge of liquid from said drum out of said sealing sleeve.

HARRY E. LA BOUR.

REFERENCES CITED

The following references are of record in the file of this patent:

UNITED STATES PATENTS

| Number | Name | Date |
|---|---|---|
| 1,806,929 | Bath | May 26, 1931 |
| 1,949,428 | McGee | Mar. 6, 1934 |
| 2,244,397 | La Bour | June 3, 1941 |
| 2,367,032 | La Bour | Jan. 9, 1945 |
| 2,381,823 | La Bour | Aug. 7, 1945 |
| 2,381,824 | La Bour | Aug. 7, 1945 |

FOREIGN PATENTS

| Number | Country | Date |
|---|---|---|
| 71,697 | Norway | Feb. 10, 1947 |